United States Patent [19]

Imai

[11] 4,412,127
[45] Oct. 25, 1983

[54] IN-FOCUS DETECTOR FOR BINOCULAR STEREOSCOPE

[75] Inventor: Toshihiro Imai, Hachioji, Japan

[73] Assignee: Olympus Optical Company Ltd., Japan

[21] Appl. No.: 337,107

[22] Filed: Jan. 5, 1982

[30] Foreign Application Priority Data

May 29, 1981 [JP] Japan ................................ 56-82250

[51] Int. Cl.³ .............................................. G01J 1/36
[52] U.S. Cl. .................................... 250/204; 350/516
[58] Field of Search ....................... 250/201, 206, 558; 350/511, 515, 516, 518

[56] References Cited

FOREIGN PATENT DOCUMENTS 55-163506 12/1980 Japan .

*Primary Examiner*—David C. Nelms
*Assistant Examiner*—Darwin R. Hostetter
*Attorney, Agent, or Firm*—Ostrolenk, Faber, Gerb & Soffen

[57] ABSTRACT

An in-focus detector for binocular stereoscope including a pair of left- and right-hand observation optics comprises a pair of beam splitters disposed on the optical axis of the respective observation optics. Each of the beam splitters derives part of observation light out of the associated observation optics and directs it to a reflecting element, which reflects the light onto a light receiver disposed at a focused position. The light receiver produces photoelectric outputs in accordance with the imaging condition of an image of an object being examined, and an in-focus detection circuit responds to these outputs by detecting an in-focus condition.

11 Claims, 9 Drawing Figures

IN-FOCUS DETECTOR FOR BINOCULAR STEREOSCOPE

BACKGROUND OF THE INVENTION

The invention relates to an in-focus detector for a binocular stereoscope, and more particularly, to an in-focus detector which is used in a binocular stereoscope to derive a control signal to automatically bring the microscope into focus.

As is well recognized, binocular stereoscopes are extensively used in various fields including medical operations, examinations, the machining of miniature parts and the like. An object being examined is frequently subject to a rapid movement, and in such instance, it is necessary that the focusing operation must be repeated each time the object has moved. In particular, when the both hands of an observer are occupied with other operations, such frequent focusing operation is very troublesome to perform. In addition, binocular stereoscopes are often of a low magnification and an increased depth of focus, which result in a poor accuracy being achieved by a manual focusing operation because of the inherent focusing effects of the eyes. Hence, if a photograph is taken under such condition, it is highly likely that an out-of-focus photograph may be obtained.

In view of the foregoing, it will be appreciated that there has been a strong need for a binocular stereoscope having an automatic focusing function which enables the stereoscope to be automatically maintained in focus upon an object being examined.

In considering an optimum in-focus detection technique which is applicable to an automatic focusing function of an binocular stereoscope, it will be seen that an in-focus detection technique of double image coincidence or vertical image alignment type will minimize the requirements for added optics to the microscope and facilitate its incorporation into the microscope inasmuch as the microscope is originally provided with a pair of left- and right-hand observation optics. An in-focus detection technique of the contrast type may also be contemplated in which an in-focus condition is detected by evaluating the sharpness of an image of an object being examined which is produced by one of the observation optics. However, as mentioned previously, the increased depth of focus of a binocular stereoscope may result in reduced accuracy. As compared with this technique, an in-focus detection technique of double image coincidence or vertical image alignment type detects an in-focus condition by determining any displacement in the position of a pair of images formed for a single object being examined, and thus permits a high accuracy to be achieved. As a result, this focusing technique is best in a binocular stereoscope.

SUMMARY OF THE INVENTION

In view of the foregoing, it is an object of the present invention to provide an in-focus detector including a pair of beam splitters, disposed in respective left- and right-hand observation optic systems, for deriving light from an object being examined from the observation optics for projection onto an associated light receiver to form an image of the object thereon. The light receiver produces an output, as a result of its photoelectric conversion, thus enabling an in-focus condition to be detected.

In accordance with the invention, the pair of left- and right-hand observation optics of a binocular stereoscope are directly utilized, thus permitting an in-focus detection of a high accuracy to be automatically achieved with a minimum amount of added optics. An in-focus detection of high accuracy is assured by a double image coincidence or vertical image alignment technique applied to part of light from an object being examined which passes through the respective observation optics of the stereoscope.

An in-focus signal which is produced as an output from the in-focus detector of the invention may be utilized to drive the observation optic systems, thus facilitating the implementation of an automatic focussing function of a binocular stereoscope. Consequently, an observer is freed from the troublesome focusing operation while assuring and facilitating the taking of properly focused microphotograh any time desired.

DESCRIPTION OF PREFERRED EMBODIMENTS

Figure 1:
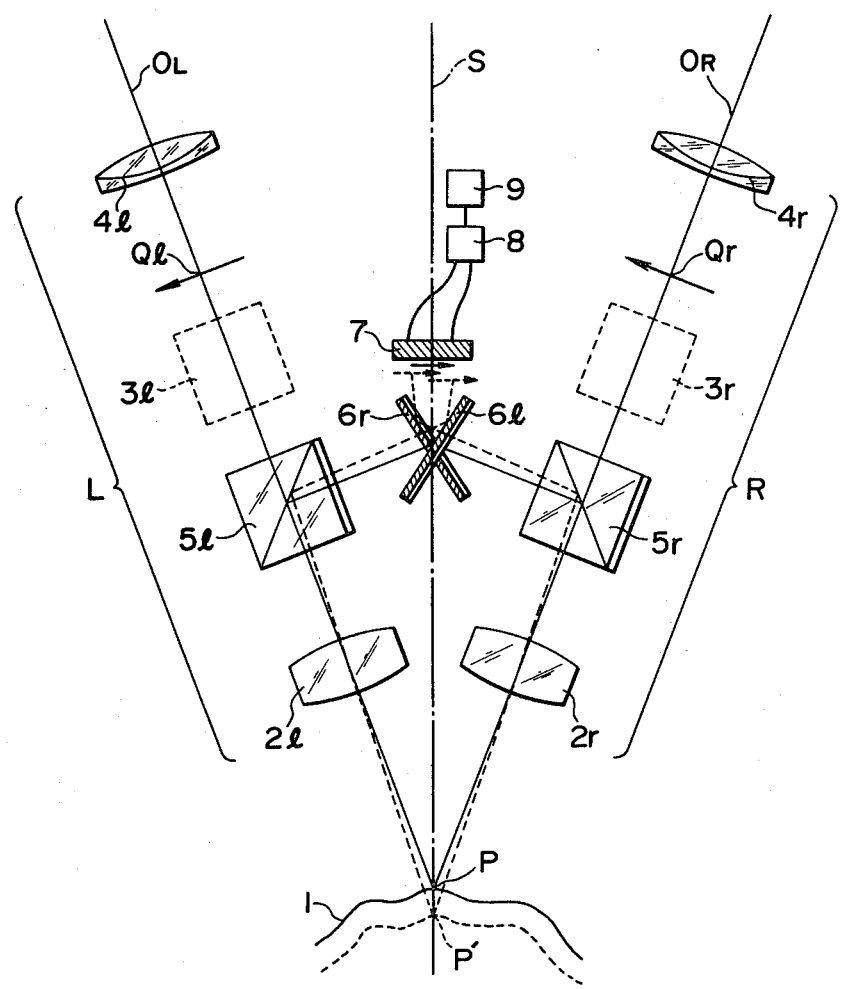
FIG. 1 is a schematic view of an in-focus detector for binocular stereoscope according to one embodiment of the invention as applied to the optics of the stereoscope.

Referring to FIG. 1, there is shown an in-focus detector for binocular stereoscope according to one embodiment of the invention. The in-focus detector comprises a pair of beam splitters 5r, 5l which are disposed in a respective pair of left- and right-hand observation optic systems R, L of a binocular stereoscope. A pair of reflecting mirrors 6r, 6l are disposed on the axis of symmetry S of the observation optic systems R, L so as to be opposite to the respective beam splitters 5r, 5l. A light receiver 7 is disposed at a location above the reflecting mirrors 6r, 6l, and an in-focus detection circuit 8 is connected to the light receiver 7.

Each of the beam splitters 5r, 5l comprises a pair a right angle prisms which are cemented together with a half mirror coating applied to the cemented surfaces. They have cubic configuration, and are disposed in the left- and right-hand observation optic systems R, L between objective lenses 2r, 2l and erect or Porro prisms 3r, 3l, respectively. The beam splitters are arranged so that the half mirror surface thereof form an angle of 45° with respect to the optical axis OR, OL of the respective observation optic systems R, L, and thus part of the light from an object being examined which passes through the individual observation optic systems R, L is reflected in a direction perpendicular to the associated optical axis OR, OL for use in detecting the in-focus condition. However, it is to be noted that the both beam splitters 5r, 5l are disposed so that their end faces where the light utilized to detect the in-focus condition emerges are slightly tilted in opposite directions from the positions where they are perpendicular to the plane of the drawing so that such light emerges from the beam splitters toward the reflecting mirrors 6r, 6l which are disposed in crossing manner forwardly and rearwardly of the axis of symmetry S.

Figure 2A:
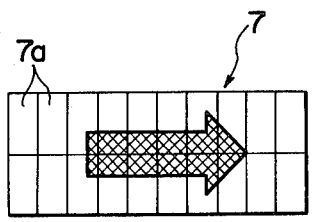
FIGS. 2(A) and (B) are diagrammatic views illustrating different imaging conditions on a light receiver of the in-focus detector shown in FIG. 1.

In a corresponding manner, the reflecting mirrors 6r, 6l, which are disposed to permit the incidence of the light used to detect the in-focus condition onto the light receiver 7 disposed above these mirrors, are slightly tilted in opposite directions from their positions perpendicular to the plane of the drawing so that the images of a point P on the object 1 being examined are focussed on the same location when in focus. Referring to FIGS. 2(A) and (B), it will be seen that the light receiver 7 comprises two rows of photoelectric transducer elements 7a which are disposed on a substrate, not shown. The light receiver is disposed in alignment with the axis of symmetry S with its light receiving surface directed downward and arranged so that it assumes a position optically conjugate with points Qr, Ql where the image of the point P is focused by the objective lenses 2r, 2l, respectively, when in focus. The light receiver 7 is connected to the in-focus detection circuit 8, which responds to photoelectric outputs from the individual transducer elements 7a of the light receiver 7 to determine whether or not the stereoscope is in focus. When in focus, the circuit 8 produces an in-focus signal which is supplied to a drive unit 9 associated with the both observation optic systems R, L. The drive unit 9 is constructed to drive the observation optic systems R, L for movement until an in-focus condition is reached, where movement of the optic system is stopped.

In FIG. 1, reference characters 4r, 4l represent eyepieces in the respective observation optic systems R, L. A usual binocular microscope is provided with an illumination optic system, which supplies light to illuminate the object 1 being examined for purpose of the observation. However, for purpose of brevity, such illumination optic system is omitted from illustration in FIG. 1.

In operation, assuming an in-focus condition, the light from the point P on the object 1 being examined (shown in solid line) impinges upon both the left- and right-hand observation optic systems R, L, and after being subject to convergence by the objective lenses 2r, 2l, they are divided by the beam splitters 5r, 5l. The observation light which has transmitted through the half mirror surface of the beam splitters 5r, 5l passes along the optical axis OR or OL and is then laterally reversed and vertically inverted by the erect or Porro prisms 3r, 3l to form the image of the point P at locations Qr, Ql, respectively, for observation with an increased magnification through the eyepieces 4r, 4l. On the other hand, the light reflected by the half mirror surface of the beam splitters 5r, 5l emerges therefrom toward the reflecting mirrors 6r, 6l, respectively, which reflect the light again for incidence upon the light receiver 7, thus forming the image of the point P on the light receiving surface thereof. Since it is assumed that the left- and right-hand observation optic systems R, C are in focus with respect to the point P being observed, the light which impinges upon the light receiver 7 has its optical axis aligned with the axis of symmetry S, so that the resulting images are focussed on the light receiving surface of the light receiver 7 in coincidence with each as indicated in FIG. 2(A). As a consequence, the number of transducer elements 7a which produce photoelectric outputs above a given level will be at its maximum. Accordingly, such condition can be detected by the in-focus detection circuit 8 to provide an in-focus signal. Obviously, the drive unit 9 does not cause any movement of the observation optic systems R, L when in focus.

Figure 2B:
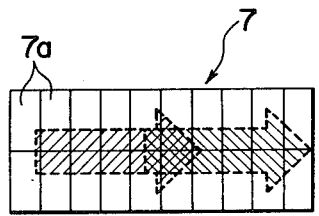

When not in focus, the light from a point P' on the object 1 being examined (shown in dotted lines) will be incident upon the left- and right-hand observation optics R, L in misalignment with the optical axis OR or OL, which is followed when in focus, as indicated by dotted lines in FIG. 1, with result that the light used to detect the in-focus condition which is divided by the beam splitters 5r, 5l and reflected by the reflecting mirrors 6r, 6l will have its axis of incident light displaced laterally either to the left or the right with respect to the axis of symmetry S. Accordingly, the images on the point P' formed by the light divided from the respective observation optics will be laterally displaced from each other on the light receiving surface of the light receiver 7 when focus thereon, as indicated in FIG. 2(B). As a result, the number of transducer elements 7a which produce photoelectric outputs above a given value decreases, and this fact is detected by the in-focus detection circuit 8 to provide an indication that the stereoscope is not in focus. A signal produced by the detection circuit 8 when not in focus is supplied to the drive unit 9, which in turn causes a movement of the observation optics R, L until an in-focus condition is reached, whereupon movement of both optic systems are stopped.

Figure 3:
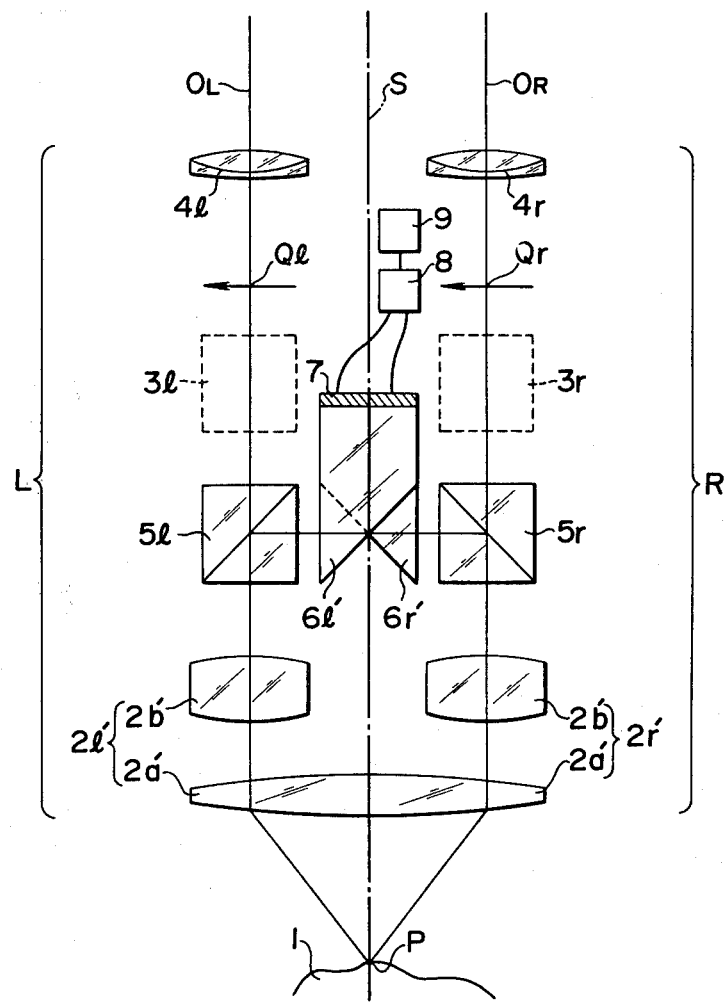
FIG. 3 is a schematic view of an in-focus detector for binocular stereoscope according to another embodiment of the invention as applied to the optics of a binocular stereoscope.

FIG. 3 shows an in-focus detector according to another embodiment of the invention. In this embodiment, a binocular stereoscope in which the in-focus detector of this embodiment is incorporated is arranged such that left- and right-hand observation optic systems R, L have optical axes OR, OL which are parallel to each other, by providing a pair of objective lenses 2r', 2l', each of which comprises an objective lens 2a' of an increased aperture which is common to the both objective lenses, and a pair of independent auxiliary objective lenses 2b'.

Figure 4A:
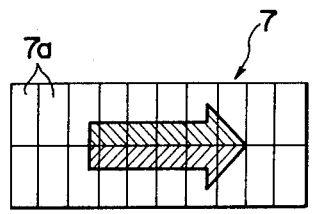
FIGS. 4(A) and (B) are digrammatic views illustrating different imaging conditions on a light receiver of the infocus detector shown in FIG. 3.

In contrast to the arrangement of FIG. 1 in which the coincidence of double images formed by light derived from the respective observation optic systems is relied upon to detect an in-focus condition, the arrangement of FIG. 3 employs an in-focus detection technique of vertical image alignment type in which the image of the upper half of the point P is formed by light derived from one of the observation optics while the image of the lower half of the point P is formed by light derived from the other observation optics so that an in-focus condition is detected when the both images are vertically aligned with each other. This removes the requirement that the emerging end faces of the beam splitters 5r, 5l and the reflection surfaces of the reflecting mirrors 6r, 6l be slightly tilted in opposite directions from their positions perpendicular to the plane of the drawing as required in the arrangement of FIG. 1. In the arrangement of the present embodiment, the emerging end faces of the beam splitters 5r, 5l are disposed opposite to each other in vertical orientation, and the reflecting mirrors 6r, 6l are replaced by trapezoidal prisms 6r', 6l' having reflecting surfaces which are disposed at an angle of 45° with respect to axes OL, OR. The prisms 6r', 6l' having an equal trapezoidal configuration of an equal size have opposite vertical sides intersected by a horizontally extending upper surface at right angles, with its lower surface being disposed at an angle of 45°. The prisms 6r', 6l' are cemented together so that the reflecting surfaces or the lower surfaces intersect with each other at right angles and so that the inner edges of the lower surfaces intersect at a point which coincides with the point of intersection of the axis of symmetry S with the optical axis of the light emerging from the beam splitters 5r, 5l when in focus. A light receiver 7 is fixedly connected to the upper surfaces of the trapezoidal prisms 6r', 6l' which are cemented together, with its light receiving surface directed downwardly, in a manner such that the line appearing in the upper surfaces which represents the joining surfaces between the both prisms is aligned with the line of boundary between upper and lower rows of transducer elements of the light receiver 7, shown in FIGS. 4(A) and (B). Other elements of the arrangement which are not specifically referred to are constructed and arranged in the identical manner as in the embodiment of FIG. 1, and are designated by like reference characters without repeating their description.

In use of the in-focus detector of the present embodiment, assuming that the arrangement is in focus, the light divided by the beam splitter 5l from the observation light passing through the left-hand observation optic system L impinges upon the left-hand end face of the forwardly located prism 6l' and is totally reflected by the lower surface or the reflecting surface thereof to form the image of the upper half of the point P on the upper row of transducer elements in the light receiver 7. On the other hand, the light divided by the beam splitter 5r from the observation light passing through the right-hand observation optic system R impinges upon the right-hand end face of the rearwardly located prism 6r' and is then totally reflected by its lower or reflecting surface to form the image of the lower half of the point P on the lower row of transducer elements of the light receiver 7. Since it is assumed that the both observation optic systems R, L are disposed in focus with respect to the point P being observed, the light impinging upon the light receiver 7 has its optical axis aligned with the axis of the symmetry S, so that the upper and the lower half of the image formed by such light are in vertical alignment with each other as indicated in FIG. 4, forming a perfectly aligned image on the light receiving surface of the light receiver 7. Accordingly, the in-focus detection circuit 8 may be arranged in a manner so that a difference in the outputs from each pair of vertically aligned photoelectric transducer elements in the upper and the lower row is detected and summed together to provide a total of absolute values of these differences. When the total is minimized or is equal to zero, a determination may be rendered that the arrangement is in focus, thus producing an in-focus signal.

Figure 4B:
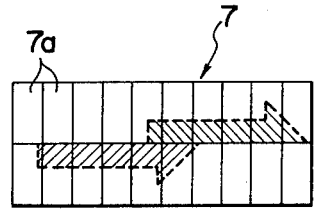

When not in focus, the optical axis of the observation light impinging upon the both observation optic systems R, L are offset from the optical axes OR, OL thereof, as mentioned previously in connection with the embodiment of FIG. 1, and hence the light utilized to detect the in-focus condition is also laterally offset with respect to the axis of the symmetry S when it impinges upon the light receiver 7. As a result, the images representing the upper and the lower half of the point being observed will be offset or displaced from each other lengthwise as shown in FIG. 4(B). Accordingly, a difference in the outputs from a pair of vertically aligned transducer elements will increase, and a total of the absolute values of these differences will no longer be at its minimum. In response thereto, the in-focus detection circuit 8 determines that the arrangement is not in focus, and produce a corresponding signal to the drive unit 9. The in-focus detection circuit 8 may be constructed so that the direction and the magnitude of displacement between the images of the upper and the lower half may be determined in response to photoelectric outputs from the light receiver 7, whereby the signal produced by the detection circuit 8 may include information indicating the direction and the magnitude of movement required of the observation optic systems R, L in order to achieve the in-focus condition, thus permitting a more rapid focusing operation by the drive unit 9.

Figure 5:
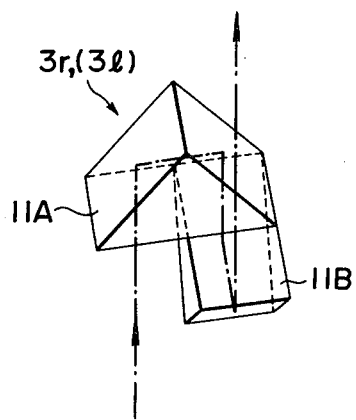
FIG. 5 is a perspective view of one form of an erect or Porro prism shown in FIGS. 1 and 3.

FIG. 5 shows a specific form of the erect or Porro prisms 3r, 3l show in broken lines in FIGS. 1 and 3. Such erect or Porro prism 3r or 3l is in itself already well known in the art, and comprises a pair of right angle prisms 11A, 11B of an equal size and configuration. The surface of one of the right angle prisms which is located opposite to the edge defining the right angle is disposed in superimposed relationship with one-half of the corresponding surface of the other right angle prism so that they generally extend at right angles to each other. Light impinging upon the exposed half of the surface, located opposite to the right angle edge, of one of the right angle prisms, 11A, is reflected four times by the angled surfaces of the both prisms 11A, 11B to emerge from the exposed half of the surface of the other right angle prism 11B which is located opposite to the edge defining the right angle thereof. In the in-focus detectors of FIGS. 1 and 3, another right angle prism may be applied to the erect or Porro prism 3r or 3l shown in FIG. 5 to allow the Porro prism to serve as a beam splitter also. In this manner, the separate provision of beam splitters 5r, 5l is avoided.

Figure 6A:
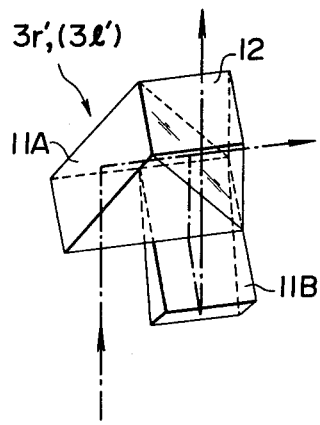
FIGS. 6(A) and (B) are perspective views of the erect or Porro prism shown in FIG. 5 to which a right angle prism is applied to serve also as beam splitter for the in-focus detector shown in FIGS. 1 and 3, respectively.
Figure 6B:
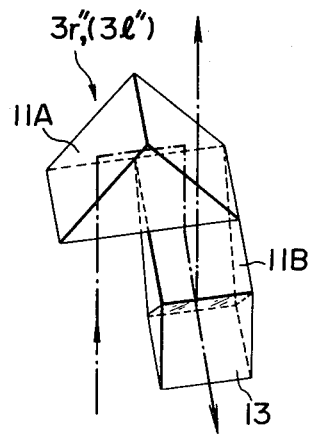

One of such examples is illustrated in FIG. 6(A) where erect or Porro prisms 3r', 3l' also serve as beam splitters. In this arrangement, a right angle prism 12 which is sized one-half the prism 11A is cemented to the angled surface of the right angle prism 11A which provides the second reflecting surface, with a half mirror coating formed on the cemented surface. The light passing through the cemented surface which defines the half mirror emerges from the right angle prism 12 in a direction perpendicular to the direction of the incident light, and hence can be utilized for detecting the in-focus condition. It should be understood that the light reflected by the cemented surface is additionally reflected by the third and the fourth reflecting surface to provide observation light. FIG. 6(B) shows another form of erect or Porro prism 3r'' (3l'') which also serves as a beam splitter. In this erect or Porro prism 3r''', a right angle prism 13 which is sized one-half the prism 11B is cemented to an angled surface of the right angle prism 11B which represents the fourth reflecting surface, with a half mirror coating on the cemented surface. As before, the light utilized to detect the in-focus condition can be taken out in a direction perpendicular to the direction of the incident light.

In the described embodiments, a light receiver is directly disposed at the location where an image will be formed by the light when the system is in an in-focus condition. Alternatively, a bundle of optical fibres which is utilized for the transmission of an image may have its one end face disposed at the focused location, with the other end face of the bundle being disposed outside the stereoscope where the coincidence of double images or the vertical alignment of images may be detected, thus allowing a reduction in the size of the stereoscope itself. While the use of an in-focus detecting technique of either double image coincidence type or vertical image alignment type has been illustrated in the described embodiments, it should be understood that any other technique may be employed provided the technique employed is capable of determining an in-focus connection based on the correlation between a pair of images formed by light divided from the observation light which passes through the left- and right-hand observation optics.

What is claimed is:

1. An in-focus detector for binocular stereoscope including a pair of left- and right-hand observation optic systems each having an optical axis; comprising:
   a pair of beam splitters each disposed on the optical path of a respective one of the observation optic systems for splitting part of observation light passing therethrough and for diverting it out of the associated observation optical path for use in detecting an in-focus condition;
   a pair of reflecting elements for directing the light diverted out of the observation output path by the respective beam splitters to a focused position which corresponds to an in-focus condition;
   a light receiver disposed at the focused position for simultaneously receiving the light from each of the reflecting elements to produce a photoelectric output in accordance with an image of an object being examined which is incident thereon;
   and an in-focus detection circuit for producing an in-focus signal in response to a photoelectric output from the light receiver.

2. An in-focus detector according to claim 1 in which each of the beam splitters comprises a pair of right angle prisms which are cemented together with a half mirror coating on the cemented surface.

3. An in-focus detector according to claim 1 in which each beam splitter comprises an erect prism having a first reflecting surface which reflects light impinging upon the prism therein in a direction perpendicular to the incident light and having a second reflecting surface which reflects the light again, and a right angle prism cemented to the second reflecting surface with a half mirror coating interposed therebetween.

4. An in-focus detector according to claim 3 in which each erect prism comprises a pair of right angle prisms of an equal size and an equal configuration which are cemented together along one-half their surfaces located opposite to the respective edges which define the right angle so as to extend at right angles to each other.

5. An in-focus detector according to claim 1 in which each of the reflecting elements comprises a reflecting mirror, and wherein the reflecting mirrors are arranged so that they reflect light from the associated beam splitters to project images of an object being examined in superimposed relationship onto the light receiver.

6. An in-focus detector according to claim 1 in which each of the reflecting elements comprises a reflecting prism, and wherein the reflecting prisms are arranged so that they reflect light from the associated beam splitters to project complementary halves of the image of an object being examined onto the light receiver.

7. An in-focus detector according to claim 1 in which the light receiver comprises a substrate on which rows of photoelectric transducer elements are formed, the elements defining a light receiving surface on which light from the reflecting elements is incident, whereby the light receiver produces a photoelectric output which depends on double images of the object being examined which is formed on the light receiving surface.

8. An in-focus detector according to claim 1 in which the light receiver comprises a substrate on which two rows of photoelectric transducer elements are formed, one of the rows producing a photoelectric output corresponding to one half of the image of an object being examined which is formed by light from one of the reflecting elements and the other row producing another photoelectric output corresponding to the remaining half of the image which is formed by light from the other reflecting element.

9. An in-focus detector according to claim 1 in which the in-focus detection circuit is responsive to photoelectric outputs of the light receiver which depend on the coincidence or alignment between double images of an object being examined, by determining the degree of imaging condition, thereby producing the in-focus signal.

10. An in-focus detector according to claim 1 in which the in-focus detection circuit determines the degree of imaging condition in response to a photoelectric output from the light receiver which corresponds to one-half of the image of an object being examined and another photoelectric output which corresponds to the remaining half of the image, thus producing the in-focus signal.

11. An in-focus detector according to claim 1 in which the in-focus signal from the in-focus detection circuit is adapted to be fed to a drive unit of the stereoscope which in turn causes a movement of the observation optics until an in-focus condition is reached.

* * * * *